May 19, 1953 M. M. STOLZER 2,638,816

APPARATUS FOR PRODUCING TELEVISION IN COLOR

Filed Nov. 14, 1950

INVENTOR
Milton M. Stolzer
BY William F. Nickel
ATTORNEY

Patented May 19, 1953

2,638,816

UNITED STATES PATENT OFFICE 2,638,816

APPARATUS FOR PRODUCING TELEVISION IN COLOR

Milton M. Stolzer, Uniondale, N. Y.

Application November 14, 1950, Serial No. 195,554

1 Claim. (Cl. 88—61)

My invention is an improvement in television apparatus, and particularly television apparatus for presenting images in color when received after transmission.

An important object of this invention is to provide an accessory or adapter which can be utilized with any television system, and especially a receiver or kinescope, in cooperation with the entire area of the screen thereof, and which produces the desired results by electrical and optical action, and requires no mechanically actuated movable parts.

The improvement can be used in place of but for fundamentally the same purposes as rotating color filters in television reception. But it differs from the rotating color filter because it functions non-mechanically without physical motion or inertia, is instantaneous in effect, and is capable of more accurate timing control; and gives adequate color filtering for even the largest kinescopes, without loss of efficiency, noise or vibration.

In its preferred form the adapter is a colorless, virtually transparent member of such size and configuration as to cover completely the whole visible area of the screen of any kinescope used at present in conventional television receivers. It is placed between the screen of the kinescope and the observer, the observer must view the images that appear on the screen of the kinescope through it. Then if at any instant the adapter assumes a certain color, the light present on the screen of the kinescope at that same instant appears as having the same color, and this color appears to change constantly in unison with the changing colors that the adapter generates. To the observer the general effect of these instantaneous color changes occurring at rapid intervals is such that the image seems to be made up of various colors in its different parts.

When these color changes in the adapter are synchronized with color controlling apparatus at the transmitting station, the location of the colors of the objects televised can be achieved. Television images in color can now be transmitted and received with rotating members; but color changes with my adapter are brought about by means of variable electrical potentials impressed upon it. These potentials are determined by electrical impulses originating at the transmitter and sent to the receiver by impressment upon the composite carrier wave. Or electrical impulses can be generated in the electric circuit of the receiver and modulated by means of a component of the composite wave coming from the transmitter; or generated independently at the receiver, as will be obvious to electronic engineers.

The following description and drawings disclose an embodiment of my adapter. But the combination of parts set forth herein is not to be limited to the exact construction described. On the contrary, the structure of the adapter may be altered in details or be given any other embodiment within the principle and scope of my invention.

Figures 1, 2, 3, 4:
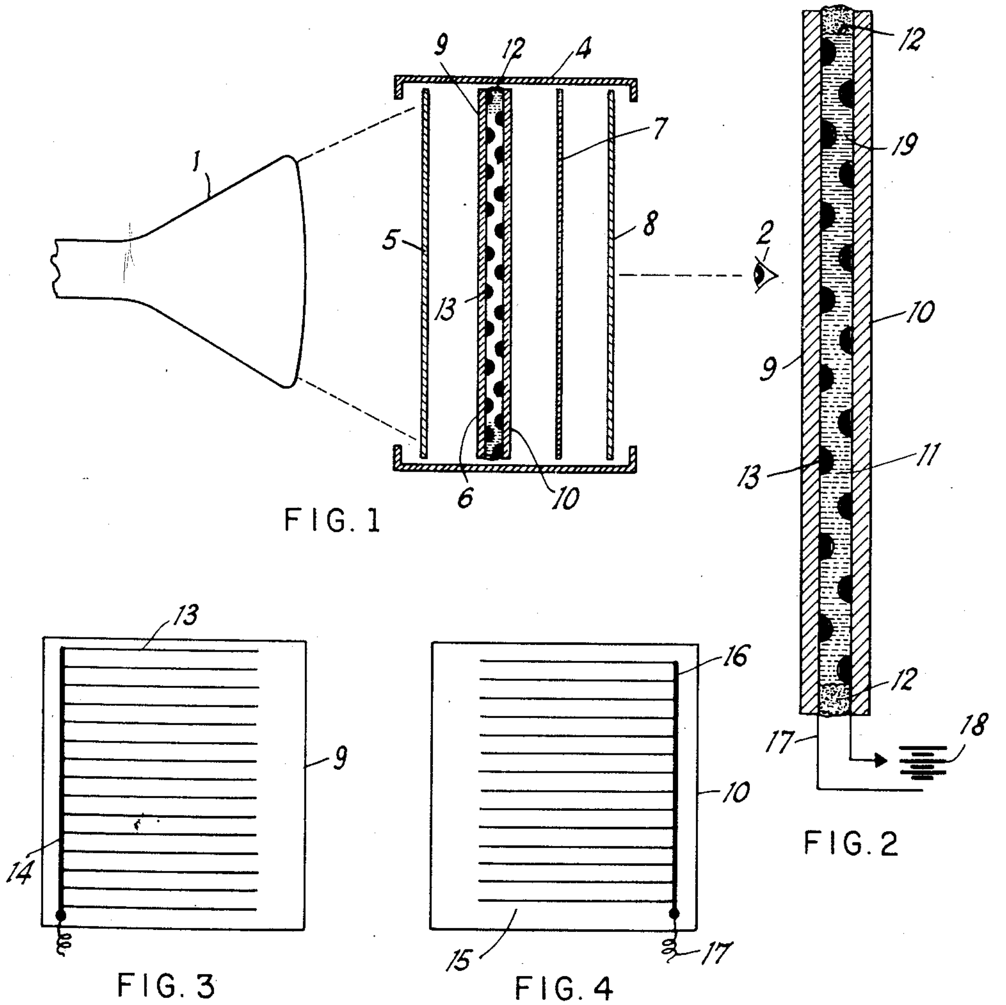
Figure 1 is a side view elevation of the assembled parts of my adapter.
Figure 2 is a section of an electric cell therein.
Figure 3 is a front elevation of one of the principal component members of this cell.
Figure 4 is a similar view of the complementary member.
Figure 5:
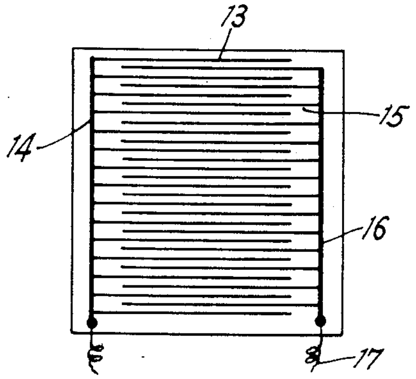
Figure 5 shows the two members in juxtaposition.

In Figure 1, the kinescope is indicated at 1 and the eye of the observer at 2. My adapter 3 is placed between the two, so that color effects can be impressed upon the light coming from the screen of the kinescope before it reaches the nerves of the observer's organs of vision.

In construction the adapter comprises a casing 4, in one end of which is a polarizing element 5. This element extends across the whole of the end and behind it is the electric member 6, connected to a suitably controlled source of electric power. Next comes a colorless transparent screen 7 having bi-refringent properties, such as cellophane, in one or more sheets and behind this screen is another polarizing element 8 of the same nature as the element 5, to serve as an analyzer. The member 6 operates to produce an electric field in the casing 4, which, with the parts above mentioned therein, has the form of a window which the light from the kinescope traverses from the element 5 through the element 8.

If an electric potential is impressed upon the member 6 to set up an electrostatic stress transverse to the plane of the polarized light passing through the polarizing element or plate 5, the plane of polarization is affected. I have found that such light of any given color at the analyzer 8 will assume a different color if the screen 7 is interposed between the member 5 and analyzer 8. The color changes according to the variation in potentials and thus a sequence of colors can be obtained to impart a full-color appearance to the pictures of the objects which the kinescope presents. The results are the same if rotating color filters are employed, but all the parts in the adapter remain stationary; requiring no motion whatever.

The member 6 is made up of two transparent plates of glass or like material 9 and 10. They enclose a narrow space 11, and this space is sealed by a filler 12 between the plates around the periphery of the member 6. The plate 9 carries parallel conductors 13 all united at one end to a conductor or pole 14. Likewise the plate 10 has on its inner face the parallel conductor strips 15 all united at one end to a conductor or pole 16. The two plates are assembled so that the strips 14 and 16 are at opposite sides of the member 5 and the conductors 13 of the one plate lie between the conductors 15 of the other, all the conductors being on the inside of the member 5. The poles 14 and 16 are connected by wires 17 to a source of electric energy indicated at 18, and the space 11 is filled with an isotropic and dielectric substance such as carbon bisulphide 19.

The strips or wires 13 and 15 with the conductors 14 and 16 are made secure to the plates 10 and 11 in any suitable manner, and the conductors on one plate are of course separated from those on the other. Also, while carbon bisulphide, a dielectric, is mentioned as an example, a non-dielectric can also be used. However, with a non-dielectric, the wires of the two grids must be insulated from the non-dielectric by means of a covering or coating of a leak-proof insoluble dielectric so that the non-dielectric isotropic substance will not be allowed to short circuit the two grids herein described.

Figure 6:
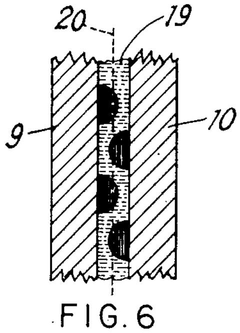
Figure 6 shows a detail enlarged and in section of said cell.

As already stated, the white light coming from the screen of an ordinary kinescope is polarized by the element 5. It passes through the grids of the member 6, one of which has its wires 13 at a higher potential than the wires 15 of the other grid, so that an electric stress is created in the direction of the line 20 in Figure 6. By the combined action of the element 5, member 6, screen 7 and analyzer 8, a desired color is seen by the observer and this color can be varied by changes of potential between the conductors 13 and 15.

The operation of my adapter depends upon the principle giving an electro-optic effect, usually designated the "Kerr electro-optic effect." Thus if an electric field is established in some isotropic substance, such as $CS_2$, such an isotropic substance becomes doubly refractive.

When light is transmitted through a polarizing screen 5 and when the plane-polarized light so produced is passed between the metal conductors 13 and 15 immersed in an isotropic substance, said conductors having an electric field of force between them, the light emerging from such isotropic substance is then elliptically polarized. When such light is further passed through a colorless bi-refringent substance such as cellophane 7 and thence through another polarizing screen 8 crossed with respect to the first, the light reaching upon the observer will appear of a color different from the light entering the window at the element 5.

For maximum effect the conductors of the grids are so disposed so that the plane of vibration of the polarized light passing from the element 5 between them makes an angle of 45° with the lines of electrical force or electrostatic stress between the grids. With no potential upon the grids, the light transmitted through the adapter has fundamentally the same color or wavelength upon emergence as upon entrance, or by virtue of the angular position of the indices of refraction of the cellophane screen 7 with respect to the planes of polarization of members 5 and 8, the emergent light may be of any one fixed wavelength or color, but when an electric field is established by impressing an electric potential upon the grids, the light emerges from the isotropic substance between the grids elliptically polarized.

This elliptically polarized light in passing through the cellophane screen 7 is caused to have the phase relationship between its axes further varied, because of the different indices of refraction in the bi-refringent cellophane. Some of the color components are virtually suppressed and are no longer visible at the second polarizing screen or analyzer, the only light that can be seen has the wave length; i. e., the particular color, not obstructed and suppressed by the screen 7, after it traverses the electric field in the member 6.

The color of the emergent light depends first on the phase difference between the two principal axes of light in its passage through the isotropic substance brought about by the electric potential or voltage impressed upon the grids of the sensitive cell. The color also depends, second, on the thickness, number of layers and refractive indices of the cellophane screen 7, and upon the angular positions of the indices of refraction of the layers of cellophane with respect to each other.

Since the properties of the screen 7 are fixed and constant, the only variation required to bring about a change of color in the adapter is a variation of potentials applied to the member 6.

Experiment shows that the vibration directions of the eliptically polarized light emerging from the member 6, that is the directions of polarization, appear to be changed in passage through the cellophane screen. In other words, they are changed in such a manner that light observed through the analyzer has a wavelength, and therefore a color, other than that of the source in the kinescope 1.

By variation of the electric potentials between the grids of the member or cell 6, when said cell is used in the prescribed assembly with the other components of the adapter, the color or wavelength of light is caused to vary through the visible spectrum from blue to red, or red to blue.

The mode of use of my adapter will now be understood. At the transmitter an adapter is set up and the changing voltage on the grids is so regulated that red, green and blue light in succession is produced at the end bearing the analyzer 8. The sequence of colors is repeated continuously at the required speed as long as the operation lasts. At the receiving end, the rays of light coming from the screen of the kinescope are all white, but the voltages between the grids of the adapter are impressed upon the member 6 in the same sequence as at the transmitter. The color red appears at the analyzer 8 of the receiver synchronously with the red light at the transmitter, and so with the other two colors, green and blue. Each color at the transmitter is synchronized at the beginning and end with the same color at the receiver and lasts for the same period of time; and the sequences likewise. The intensity of the voltage to produce each is generated at the transmitter and/or receiver, and the voltages to produce each color are also synchronized. These potentials can be generated by apparatus operating independently at the transmitter and receiver, or controlled by a component of the carrier wave which brings the signals.

The adapter at either end can be as above described or the adapter at either end can be made to operate with a rotating color disk at the other. My adapter is capable of effecting colored television with either field sequences, line sequences, or dot sequences. For field sequences, a color adapter with rotatable filters and my adapter should work very well, but with line and dot sequences, my adapter should be used both at the receiver and in front of the television camera.

It is stated above that the plane of the polarized light makes an angle of 45° with the lines of electrostatic stress between the conductors of the two grids on the plates 9 and 10; the conductors 13 and 15 of which lie side by side in a sort of "dovetailed" fit; that is the plane of polarization is tilted at an angle of 45° to the direction of these lines of force. The plane is really perpendicular to the plane of the entire field and to the plates 9 and 10, but it is tilted at the angle of 45° to the line 20, and at the same angle to the conductors 13 and 15 on the plates 9 and 10.

While I have mentioned the screen 7 as made of cellophane I of course may utilize any other virtually transparent medium having the same optical properties.

The screen 7 permits one color component of the elliptically polarized light to pass in greater amount and obstructs or absorbs other components. Hence the control of the color of the light passing through it can be controlled. If the screen 7 were omitted, the adapter would control not the color but only the amount of the light passing through it.

Having described my invention, what I believe to be new is:

A color adapter for television comprising a polarizing element, an isotropic substance and a pair of grids in said substance to transmit light from said element, a stationary bi-refringent screen of cellophane, said substance and said grid being located between said element and said screen, a conductor attached to each grid to impress electric potentials on said grids and create an electric field of stress in said substance, said element having the property of polarizing light in a plane at an angle of approximately 45 degrees to the direction of the stress in said field and said substance and said field having the property of elliptically polarizing the light from said element, the screen permitting light of only one color to pass it at predetermined variations in said potentials and an analyzer for the light transmitted by said screen.

MILTON M. STOLZER.

References Cited in the file of this patent

UNITED STATES PATENTS

| Number | Name | Date |
|---|---|---|
| 2,109,540 | Keishman | Mar. 1, 1938 |
| 2,350,892 | Hewson | June 6, 1944 |
| 2,493,200 | Land | Jan. 3, 1950 |
| 2,528,510 | Goldmark | Nov. 7, 1950 |